K. STEINBECKER.
ENGINE.
APPLICATION FILED MAY 9, 1913.

1,119,658.

Patented Dec. 1, 1914.

Witnesses:
Marcus L. Byng.
J. Ellis Glen.

Inventor:
Karl Steinbecker,
by
His Attorney.

UNITED STATES PATENT OFFICE.

KARL STEINBECKER, OF CHARLOTTENBURG, GERMANY, ASSIGNOR TO GENERAL ELECTRIC COMPANY, A CORPORATION OF NEW YORK.

ENGINE.

1,119,658.     Specification of Letters Patent.     Patented Dec. 1, 1914.

Application filed May 9, 1913. Serial No. 766,538.

*To all whom it may concern:*

Be it known that I, KARL STEINBECKER, a subject of the Emperor of Germany, residing at Charlottenburg, Germany, have invented certain new and useful Improvements in Engines, of which the following is a specification.

The present invention relates to the construction of engines of the type wherein each cylinder is provided with oppositely moving pistons that are situated on the same side of and are connected to the main shaft. by connecting rods. In such engines the crosshead attached to the outer piston and to the side connecting the rods works in guide slots formed in an extension of the cylinder. The walls of these guide slots are subjected at times to thrusts which tend to spread or open them.

My invention has for its object to improve the construction of such engines, particular reference being made to the means for preventing the crosshead guides from spreading due to the thrusts to which they are subjected.

Figure 1:
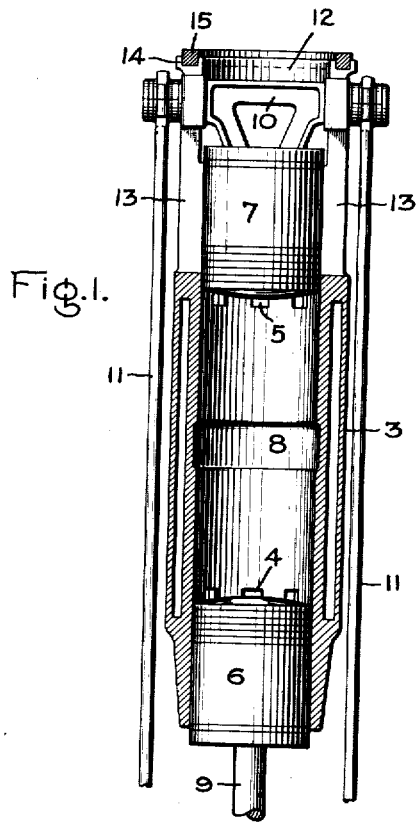
Figure 2:
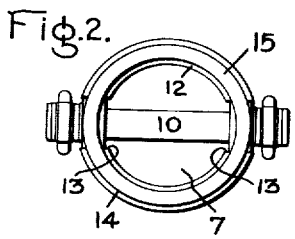

In the accompanying drawing Figure 1 shows an internal combustion engine embodying my invention, and Fig. 2 a plan view thereof.

3 indicates the cylinder which may be of any suitable construction. It is provided with inlet ports 4 and exhaust ports 5 that are controlled by the pistons 6 and 7. Fuel is introduced by any suitable means to the combustion chamber 8 between the pistons. The inner piston 6 is connected to the crank shaft by the main connecting rod 9. To the outer piston is attached a crosshead 10 and between it and the crank shaft are side connecting rods 11. The crosshead is guided by an annular extension 12 on the cylinder which also serve to guide the outer piston. The extension is preferably formed integral with the cylinder and has diagonally opposed slots 13 through which the side arms of the crosshead extend. The outer end of the extension is open and hence the side thrust of the crosshead tends to spread the parts thereof. To prevent this an annular member or ring is provided which connects the two principal parts of said extension. Between said member and extension are interlocking shoulders formed on one part or the other. As shown the outer end of the extension is somewhat enlarged and in the end face thereof is turned a groove 14 the side walls of which are parallel to each other and concentric with the axis of the cylinder. The advantage of this arrangement resides in the fact that the groove can be made on the same machine which bores the cylinder, thereby utilizing one setting of the casting for two purposes. Also in the fact that accurate results may be obtained. Situated in the groove is a ring 15 of polygonal cross section which is accurately turned to make a snug fit with the walls thereof. Preferably the ring will be so fitted that no retaining devices are required to hold it but on the other hand it must be readily removable to enable the crosshead and outer piston to be taken out. The ring should be located rather close to the outer position of the crosshead. It may be sunk wholly or partially in the cylinder extension. It adds very little additional weight because metal in the extension is cut away to receive it. Being seated in an annular groove, except for the short distance where it bridges the crosshead slots, the ring is well supported and not liable to be distorted. Being in a groove it reinforces the cylindrical extension both inside and out for its entire periphery.

It will thus be seen that my improved construction has the advantage of possessing great strength for a small additional amount of metal, simplicity and small cost.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. In an engine, the combination of a cylinder having a slotted extension forming a guide, oppositely moving pistons in the cylinder, a crosshead for one of the pistons that enters the slot and is guided by the walls thereof, rods for connecting the pistons with the engine shaft, and an annular member for uniting the parts of said extension.

2. In an engine, the combination of a cylinder, an annular slotted extension therefor which forms piston and crosshead guides and has a grooved end face, oppositely moving pistons in the cylinder, a crosshead for one of the pistons that enters the slots and is guided by the walls thereof, rods for connecting the pistons with the engine shaft, and a ring that is seated in said groove for preventing the crosshead from spreading the walls of the slots.

3. In an engine, the combination of a cylinder, an annular extension therefor having slots formed therein which extend from the outer end inward, oppositely moving pistons in the cylinder, a crosshead for one of the pistons which enters the slots and is guided by the walls thereof, rods for connecting the pistons with the engine shaft, and an annular removable ring fitted to the outer end of the annular extension for uniting the parts of said extension.

In witness whereof, I have hereunto set my hand this 12th day of April, 1913.

KARL STEINBECKER.

Witnesses:
HENRY HASPER,
WOLDEMAR HAUPT.

It is hereby certified that in Letters Patent No. 1,119,658, granted December 1, 1914, upon the application of Karl Steinbecker, of Charlottenburg, Germany, for an improvement in "Engines," errors appear in the printed specification requiring correction as follows: Page 1, line 15, second occurrence, strike out the article "the"; same page, line 42, for the word "serve" read *serves;* and that the said Letters Patent should be read with these corrections therein that the same may conform to the record of the case in the Patent Office.

Signed and sealed this 5th day of January, A. D., 1915.

[SEAL.]

R. F. WHITEHEAD,
*Acting Commissioner of Patents.*